United States Patent [19]
Kaufman

[11] 3,900,407
[45] Aug. 19, 1975

[54] COMPOSITION FOR CLEANING AND GLAZING FURS

[75] Inventor: Benjamin Kaufman, Philadelphia, Pa.

[73] Assignee: Colgate-Palmolive Company, New York, N.Y.

[22] Filed: Dec. 14, 1972

[21] Appl. No.: 315,256

[52] U.S. Cl. .................... 252/8.57; 8/94.14; 8/137; 252/121; 252/122; 252/127
[51] Int. Cl. ...................... C11d 9/46; D06m 13/00
[58] Field of Search .......... 252/8.57, 111, 114, 118, 252/121, 122, 127, DIG. 14; 8/94.14

[56] References Cited
UNITED STATES PATENTS

| | | | |
|---|---|---|---|
| 2,073,464 | 3/1937 | Davey | 252/122 |
| 2,807,557 | 9/1957 | Carney | 8/94.14 X |
| 3,124,536 | 3/1964 | Ware | 252/8.57 X |
| 3,203,900 | 8/1965 | Carroll et al. | 252/110 |
| 3,360,476 | 12/1967 | Krusius | 252/114 X |

FOREIGN PATENTS OR APPLICATIONS

| | | | |
|---|---|---|---|
| 573,145 | 11/1945 | United Kingdom | 252/121 |

*Primary Examiner*—Herbert B. Guynn
*Attorney, Agent, or Firm*—George H. Mortimer

[57] ABSTRACT

A composition for cleaning and glazing animal and synthetic furs containing from about 0.05 to 0.2 weight percent of potassium oleate; about 0.05 to 0.2 weight percent of an anionic and/or non-ionic detergent; about 0.02 to 0.1 weight percent of a terpene oil; about 0.05 to 0.2 weight percent of a liquid silicone disposed in an aqueous emulsion, about 15 to 50 weight percent of alcohol with the remainder being water. This composition is applied to the fur by spraying, and then rubbing the fur with a terry cloth.

1 Claim, No Drawings

COMPOSITION FOR CLEANING AND GLAZING FURS

The present invention is directed to a composition for cleaning and glazing animal and synthetic furs.

The cleaning and glazing of furs, such as prior to storage of the furs, has been a longfelt problem. Thus, well cleaned fur should present a lustrous uniform appearance, and must also possess desirable hand. By "desirable hand" is meant that the fur appears soft to the touch. A further complicating factor is that the cleaning and glazing composition must not appreciably adversely affect the fur, as by extracting excessive portions thereof, nor should it loosen the fur hairs nor cause pilling nor clustering thereof.

A wide variety of solvent systems and soap systems have been suggested for the cleaning of furs. However, each of such systems known to the applicant suffers from one or more inadequacies, such as failure to leave the fur with desirable hand, adverse affect upon the fur, or failure to achieve a desirable appearance of lustre to cleaned fur.

This invention has as an object the provision of a composition for cleaning and glazing furs.

This invention has as a further object the provision of a composition which may be used on a wide variety of furs, both animal and synthetic, which will achieve the aforesaid desiderata.

Other objects will appear hereinafter.

The aforesaid objects are achieved by the cleaning and glazing composition of the present invention which comprises a uniform mixture containing between about 0.05 to 0.2 weight percent of potassium oleate, about 0.05 to 0.2 weight percent of a non-soap anionic and/or non-ionic detergent; about 0.02 to 0.1 weight percent of a terpene oil; about 0.05 to 0.2 weight percent of a liquid silicone oil; about 15 to 50 weight percent of a liquid low molecular weight alcohol which does not have an adverse odor, such as methanol, ethanol, propanol, or isopropanol; and the remainder being water. In use the composition is sprayed onto the fur, as from an air sprayer, or by means of an aerosol propellent, such as the use of isobutane or R-12. Thereafter, the treated fur is rubbed with a terrycloth or the like, in the direction of the fur hairs. After the fur is dried it may be shaken.

I have found that potassium oleate soap of National Formulary grade achieves superior cleaning over hard soaps, when used in conjunction with the remaining components of my composition. Preferably, the amount of the soap should be about the same as the amount of the non-soap detergent, namely between 0.05 and 0.2 weight percent, and preferably about 0.1 weight percent.

The presence of the non-soap detergent is necessary to enhance the action of the potassium oleate soap. The non-soap detergent enables the soft soap to achieve better wetting on the fur hairs. Since washing in the conventional sense is not feasible with furs, the wetting action of the non-soap detergent is necessary. Anionic and/or non-ionic non-soap detergents are to be preferred. Suitable non-soap anionic surfactants are the sodium linear alkylate sulfonates. A wide variety of these materials are commercially available, and their chemistry is well-known. Many examples are given in the literature, such as in *Becher Emulsions: Theory and Practice*, Second Edition, Reinhold Publishing Corporation, 1965, pages 218 et seq. Suitable commerical materials are Bio-Soft D-40 made by Stefan Chemical Co., Nacconol 40DS made by Allied Chemical Co., and Ultrawet 45DS made by ARCO Chemical Co.

A wide variety of non-ionic surfactants may be used. In particular, the ethoxylated alcohol non-ionic surfactants are desirable. A wide variety of these are disclosed in the booklet Atlas Surface Active Agents, copyright 1950 by Atlas Powder Company. Other examples include Bio-Soft EA-8 made by Stefan Chemical Co., and Plurafac A-24 made by Wyandotte Chemical Co.

The non-soap surfactant which may be the anionic non-soap surfactant by itself, or the non-ionic surfactant by itself, or a mixture of the non-soap anionic and non-ionic surfactant should be present to the extent of between about 0.05 to 0.2 weight percent measured on active non-soap surfactant (many compositions are commercially available in which the surfactant constitutes but a portion of the composition).

The terpene oil should be miscible with alcohol, and is present for its desirable odor-conferring properties and for its solvent action, and disinfectant action. Suitable terpene oils include pine oil, rose oil, camphor, eucalyptus oil and menthol. The concentration of the terpene oil in the composition should be preferably about one-half that of the potassium oleate soap or the non-soap detergent, such as between 0.02 and 0.1 weight percent.

Liquid silicone in an emulsified state should be present in the composition to the extent of between 0.05 to 0.2 weight percent (based on the silicone). The silicone is emulsified with the remainder of the composition. The silicone confers desirable hand properties when applied to the fur in admixture with the remaining components. Moreover, I believe that the silicone also confers moisture resistance properties to the fur, and reduces the static electricity properties of the fur.

The silicone should be added to the composition as a silicone emulsion, such as an aqueous emulsion of a low molecular weight liquid silicone having approximately one-third by weight of silicone. A wide variety of commercial aqueous emulsions of low molecular weight silicones are available, and may be used in the compositions of the present invention. The silicone used must have a molecular weight low enough to be a liquid and high enough to be an oil. It must also be capable of forming an emulsion in an aqueous vehicle in which the silicone oil constitutes about one-third by weight of the emulsion. Silicones having these characteristics are well known to those skilled in the silicone art. Suitable examples include Silicone LE-46 made by Union Carbide Corporation and Dow Corning Silicone 8 Emulsion made by Dow Corning Corporation. Silicone LE46 is an aqueous emulsion containing about 35% by weight of silicone oil consisting of dimethyl polysiloxanes having a nominal viscosity of the contained oil of 10,000 centistokes at 25 C. It is a milky-white emulsion dilutable with water. Dow Corning Silicone 8 Emulsion is a water dilutable white aqueous emulsion containing about 35% dimethyl silicone liquid having a viscosity of 1,000 centistokes.

The amount of the silicone in the cleaning and glazing composition should be between about 0.05 to 0.2 weight percent based on the active silicone.

The alcohol may, as above-indicated, be any low molecular weight alcohol not possessing an undesirable odor, such as methanol, ethanol, propanol, or isopropanol. The alcohol confers both desirable solvent properties on the components of the composition, and enables the composition to achieve rapid drying.

The mixture of the alcohol and water materially aids the prevention of static charges from forming on the cleaned and glazed furs. The alcohol should be present to the extent of between about 15 and 50 weight percent, with the remainder of the composition being water. Particular concentrations of the alcohol may be dictated by considerations such as corrosion if the composition is stored in a metal can.

The composition may be directly sprayed from an air nozzle or hand sprayer onto the furs, or it may be sprayed as an aerosol. If the composition is used as an aerosol, stabilizers may be added, such as morpholine or sodium nitrite to facilitate storage in metal cans. Conventional aerosol propellents, such as isobutane or R-12 may be used in the aerosol embodiments of the cleaning and glazing compositions of the present invention.

Alternatively, the cleaning and glazing composition of the present invention may be applied to an absorbent toweling, such as paper or fabric toweling, and the cleaning and glazing composition applied to the fur by rubbing with the toweling, followed by rubbing with the terrycloth.

In the cleaning of furs, unlike the cleaning of conventional materials, there is no washing in the sense of applying a separate rinse after the application of the cleaning and glazing composition. For this reason, the amount of the cleaning and glazing composition to be applied to the fur should be controlled to the minimum level which achieves the desired results. Of course, at least a portion of the cleaning and glazing composition is removed when the fur is rubbed with terrycloth, or the like, after the cleaning has been accomplished.

The following examples are given to illustrate the invention. All parts given are parts by weight. The values set forth in the examples, as well as the specific components, however, should not limit the scope of the invention since various modifications are obvious to those experienced in the art.

EXAMPLE I

The cleaning and glazing composition for furs is prepared by blending with agitation at room temperature to form a uniform mixture the following:

0.3 parts by weight of Silicone LE-46 obtained from Union Carbide Corp. This is an aqueous emulsion containing about 30 weight percent of silicone oil.
0.1 weight percent of potassium oleate, N.F.
0.1 weight percent of Tween 20 obtained from Atlas Powder Company. Tween 20 is an oily liquid consisting of polyoxyethylene sorbitan monolaurate.
0.05 weight percent of pine oil.
20.00 weight percent of anhydrous alcohol.
79.45 weight percent of deionized water.

EXAMPLE II

The cleaning and glazing composition for furs is prepared by blending with agitation at room temperature to form a uniform mixture the following:

0.2 weight percent of a commercial solution of the anionic detergent Nacconol 40 DS sold by Allied Chemical Co. containing 66 weight percent active detergent.
0.2 weight percent potassium oleate.
0.08 weight percent eucalyptus oil.
0.5 weight percent of an aqueous emulsion containing 30 weight percent of the silicone oil derived from Dow Corning Silicone 8 emulsion.
45 weight percent of anhydrous isopropanol.
54.02 weight percent of deionized water.

EXAMPLE III

The cleaning and glazing composition for furs is prepared by blending with agitation at room temperature to form a uniform mixture the following:

0.07 weight percent of potassium oleate.
0.1 weight percent of the non-ionic surface active agent Span 20 which is an oily liquid form of sorbitan monolaurate made by Atlas Powder Company.
0.05 weight percent of the anionic surface active agent Ultrawet 45 DS sold by ARCO Chemical Co.
0.03 weight percent of menthol.
0.4 weight percent of an aqueous emulsion consisting of 30 weight percent of liquid silicone sold as Silicone LE 46 made by Union Carbide Corporation.
40 weight percent of anhydrous propyl alcohol.
59.35 weight percent of deionized water.

EXAMPLE IV

The cleaning and glazing composition for furs is prepared by blending with agitation at room temperature to form a uniform mixture the following:

0.09 weight percent of potassium oleate.
0.1 weight percent of the non-ionic surface active agent Bio-Soft EA-8 made by Stefan Chemical Co.
0.05 weight percent of pine oil.
0.3 weight percent of a silicone emulsion containing 30 weight percent of silicone oil derived from Silicone LE-46 sold by Union Carbide Corp.
18 weight percent alcohol.
81.46 weight percent of deionized water.

EXAMPLE V

The cleaning and glazing composition for furs is prepared by blending with agitation at room temperature to form a uniform mixture the following:

0.05 weight percent of potassium oleate.
0.05 weight percent of the non-ionic surface active agent Span 80 sold by Atlas Powder Company which consists of sorbitan monooleate.
0.05 weight percent of camphor.
0.15 weight percent of an aqueous emulsion containing 30 weight percent silicone oil derived from Silicone LE-46.
30 weight percent anhydrous ethanol.
69.7 weight percent of deionized water.

The components making up the cleaning and glazing composition for furs of the present invention coact synergistically with each other. Thus, the reduction is static electric charges on the fur obtained as a result of treatment in accordance with the subject invention is far above that which would be expected from the action of each of the component. Similarly, the components confer upon the fur a lustre and glazing in excess of that which would be expected.

The cleansing of soiled furs can be achieved with the composition of the present invention notwithstanding the very low concentrations of potassium oleate used in the compositions.

The compositions for cleaning and glazing furs of the present invention enable a wide variety of furs to be cleaned and glazed, and confer good hand and good antistatic electricity properties upon the fur. Furs may be cleaned rapidly to produce a lustrous, clean uniform article.

The present invention may be embodied in other specific forms without departing from the spirit or essential attributes thereof and, accordingly, reference should be made to the appended claim, rather than to the foregoing specification as indicating the scope of the invention.

I claim:

1. A composition for cleaning and glazing fur consisting essentially of a uniform mixture of about 0.05 to 0.2 weight percent of potassium oleate, about 0.05 to 0.2 weight percent of a non-soap detergent selected from the group consisting of anionic and non-ionic detergents, about 0.02 to 0.1 weight percent of a terpene oil, about 0.05 to 0.2 weight percent of a liquid silicone oil, about 15 to 50 weight percent of an alcohol selected from the group consisting of methanol, ethanol, propanol, and isopropyl alcohol, with the remainder being water.

* * * * *